(12) United States Patent
Degner et al.

(10) Patent No.: US 8,477,487 B2
(45) Date of Patent: Jul. 2, 2013

(54) COMPUTER HINGE HAVING A HOLLOW CLUTCH

(75) Inventors: Brett William Degner, Menlo Park, CA (US); John M. Brock, San Francisco, CA (US); Bradley Joseph Hamel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 12/907,931

(22) Filed: Oct. 19, 2010

(65) Prior Publication Data

US 2011/0242756 A1      Oct. 6, 2011

Related U.S. Application Data

(60) Provisional application No. 61/321,088, filed on Apr. 5, 2010.

(51) Int. Cl.
*H05K 7/00* (2006.01)
(52) U.S. Cl.
USPC .......... 361/679.28; 361/679.58; 361/755; 361/827; 439/31; 439/165; 455/575.3
(58) Field of Classification Search
USPC .......... 361/679.26–679.29, 679.58, 707, 361/712, 752, 755, 815, 817, 826–827
See application file for complete search history.

(56) References Cited

U.S. PATENT DOCUMENTS

| | | | |
|---|---|---|---|
| 4,959,887 A | 10/1990 | Gruenberg et al. | |
| 4,986,507 A | 1/1991 | Chiang | |
| 5,043,846 A | 8/1991 | Kinoshita | |
| 5,131,779 A | 7/1992 | Sen | |
| 5,566,048 A | 10/1996 | Esterberg et al. | |
| 5,572,769 A | 11/1996 | Spechts et al. | |
| 5,646,822 A * | 7/1997 | Bhatia et al. | 361/679.27 |
| 5,751,544 A | 5/1998 | Song | |
| 6,189,602 B1 * | 2/2001 | Tanahashi et al. | 165/86 |
| 6,507,490 B2 * | 1/2003 | Sasaki et al. | 361/679.47 |
| 6,912,785 B2 * | 7/2005 | Mitchell | 29/890.032 |
| 7,042,716 B2 | 5/2006 | Shearman | |
| 7,580,518 B2 * | 8/2009 | Harmon et al. | 379/433.13 |
| 2004/0080908 A1* | 4/2004 | Wang et al. | 361/687 |
| 2007/0050946 A1* | 3/2007 | Shih et al. | 16/367 |
| 2008/0109993 A1* | 5/2008 | Myeong | 16/277 |
| 2008/0229544 A1 | 9/2008 | Hsu et al. | |

OTHER PUBLICATIONS

Maeda et al., "Small Hinge Design for Laptop Computer," http://www.ip.com/pubview/IPCOM000121432D, Apr. 3, 2005.

* cited by examiner

*Primary Examiner* — Courtney Smith
(74) *Attorney, Agent, or Firm* — Womble Carlyle Sandridge & Rice LLP (57) ABSTRACT

A hinge assembly having a hollow clutch is arranged to pivotally couple a portable computer base portion to a portable computer lid portion. The hinge assembly includes at least a hollow cylindrical portion that includes an annular outer region and a central bore region, the central bore region suitably arranged to provide support for electrical conductors between the base and lid portions. The hinge assembly also includes a plurality of fastening components that couple the hollow clutch to the base portion and the lid portion of the portable computer, with at least one of the fastening regions being integrally formed with the hollow cylindrical portion such that space, size and part count are minimized. The integrally formed fastening region(s) can be flat with holes dispersed therethrough for screws, bolts or the like. The central bore can also support a heat transfer element and can also serve as a lubricant reservoir.

21 Claims, 6 Drawing Sheets

COMPUTER HINGE HAVING A HOLLOW CLUTCH

CROSS-REFERENCE TO RELATED APPLICATION

This application claims priority to commonly owned and co-pending U.S. Provisional Patent Application No. 61/321,088, filed Apr. 5, 2010, entitled "Hollow Clutch," which is incorporated by reference herein in its entirety and for all purposes.

TECHNICAL FIELD

The present invention relates generally to portable computing devices, and more particularly to advanced hinge assemblies for coupling major components in such portable computing devices.

BACKGROUND

Portable computing devices having movable parts generally require hinge mechanisms that assist the movement of one major component relative to another. For example, a laptop computer or clamshell type cellular telephone can be formed of a lower base component that is movably coupled to an upper display component. The lower base unit or assembly can typically include items such as a keyboard, touchpad, buttons, speakers, processors, memory, battery and the like, while the upper display unit or assembly can have one or more displays, touch screens, buttons, speakers and so forth. It is often desirable to electrically connect various operational components from the lower base to the upper display assembly, and vice-versa.

Typically, the lower base and upper display components in laptops, clamshell phones and the like are coupled together using a hinge assembly. The hinge assembly allows an upper display component to rotate or pivot relative to a lower base component, which may remain in a desired static position. The display housing is typically movable about the hinge assembly between a closed position against the base housing and an open position with the display, keyboard and other input devices exposed for use. Such hinge assemblies typically have one portion that is secured to the upper display housing and another portion that is secured to the lower base housing. Portable computer hinges typically incorporate spring/friction mechanisms for rotating the display housing and for maintaining it in a static position. With the constant decrease in the size of portable computers and other similar devices, a desire to decrease the size of the hinge assemblies is strong.

Various issues arise when the design of a hinge assembly is decreased, however. For example, a greater outer force can be required to generate a suitable friction force sufficient to maintain the upper display assembly in an open position. This force increase can result in increased stress on the hinge assembly as well as any associated electrical connectors. In this regard, there remains a need to maintain electrical connections between the upper display portion and bottom base portion without unduly jeopardizing the reliability of such wirings or connections. Further, the ability to provide stronger parts and assemblies that perform a hinging function with fewer overall parts would be beneficial from a manufacturing perspective.

While many designs and techniques used to provide hinge mechanisms for portable computing devices have generally worked well in the past, there is always a desire to provide improvements in such hinges, particularly where such improvements can result in a smaller overall hinge design. Therefore, a smaller yet reliable, rugged, and lower force hinge assembly that facilitates the passage of associated electrical connectors while using fewer parts for use in a portable computing device is desired.

SUMMARY

It is an advantage of the present invention to provide hinge assemblies for portable computing devices that are smaller yet still reliable, rugged, and requiring lesser outer forces, and that also facilitate the passage of associated wires while using fewer overall parts. This can be accomplished at least in part through the use of a hinge assembly that includes a hollow clutch allowing for wires to pass therethrough, as well as at least one connector that is integrally formed with the hollow clutch.

Broadly speaking, the embodiments disclosed herein describe a hinge assembly arranged to pivotally couple a lower base portion of a portable computing device to an upper lid or display portion of the portable computing device. A portable computing device can be a laptop computer or a cellular telephone, for example.

In various embodiments, a hinge assembly arranged to pivotally couple a portable computer base portion to a portable computer lid portion includes an outer clutch barrel adapted to house a plurality of components therein, a hollow clutch disposed within the outer clutch barrel, a first fastening component adapted to couple the hollow clutch to the lid portion of the portable computing device, and a second fastening component adapted to couple the hollow clutch to the base portion of the portable computing device. The hollow clutch can be cylindrical in nature, and can include an annular outer region and a central bore region surrounded by the annular outer region, wherein the central bore region is arranged to permit the passage of and provide support for one or more electrical conductors adapted to electrically connect the base portion to the lid portion of the portable computing device. In addition, at least one of the first an second fastening components can be integrally formed with the hollow clutch, which results in stronger and fewer parts overall.

In various further embodiments, a portable computing device can include a a base portion having a plurality of components including at least a processor and one or more user input devices, a lid portion having a display in communication with one or more of the plurality of components in said base portion, one or more electrical conductors that electrically connect the base portion to the lid portion, and a hinge assembly such as that which is set forth above. In still further embodiments, a hollow clutch adapted to help pivotally couple a portable computer base portion to a portable computer lid portion can include a first region having an annular outer component and a central bore component such as that which is set forth above, and a second region having a fastening component adapted to couple the hollow clutch to the lid portion or the base portion of the portable computing device. The first and second regions can be integrally formed as a single part.

In various detailed embodiments for any of the foregoing hinge assembly, portable computing device or hollow clutch embodiments, the portable computing device can be a laptop computer, and the hollow clutch can have a cylindrical shape at the annular outer region and central bore region. In addition, a friction band disposed within the outer clutch barrel can contact the outer surface of the hollow clutch along the annular outer region, with the friction band being adapted to provide a restraining force sufficient to maintain the lid portion in an open position relative to the base portion. The central bore region can be further adapted to contain and disperse a lubricant that operates to lubricate the surfaces of interacting parts within said outer clutch barrel, and the central bore region can also be further adapted to permit the passage of and provide support for a heat exchanging component adapted to facilitate the transfer of heat between the base portion and the lid portion.

In additional detailed embodiments, the fastening component(s) that is integrally formed with the hollow clutch can include a flattened surface having one or more holes extending therethrough, the one or more holes being adapted to accept one or more fasteners that fasten the respective fastening component and hollow clutch to said lid portion or base portion of the portable computing device. The one or more fasteners that are received in the holes can be screws, bolts, nails, pins, rivets or any other suitable fastening means.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive computer hinge having a hollow clutch. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a portable computing device, such as any of various laptop computers manufactured by Apple Inc. of Cupertino, Calif. Although the various embodiments set forth in detail herein are described with respect to laptop computers, it will be readily appreciated that the various embodiments set forth herein can also apply to other forms of computing devices having hinged major components in communication with each other. For example, clamshell type cellular telephones, among other computing and electronic devices, can also utilize the various hinge assemblies, hollow clutches and details of the present invention.

Figure 1A:
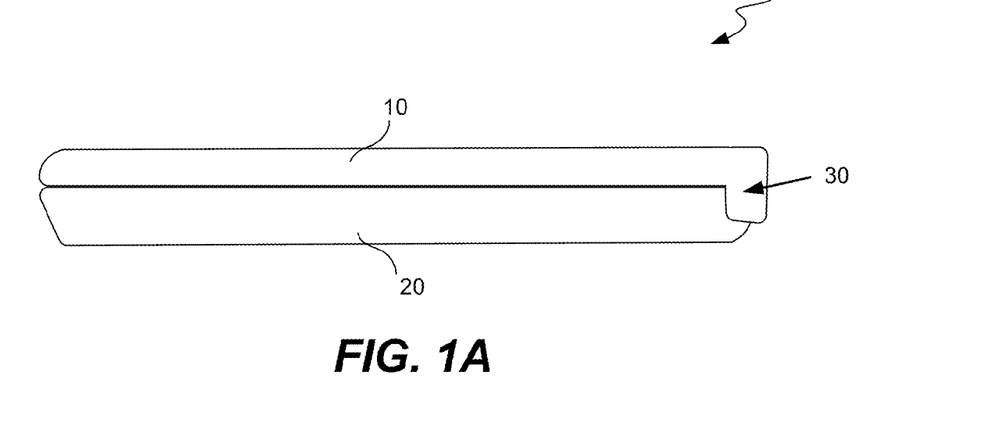
FIG. 1A illustrates in side elevation view an exemplary portable computing device.

One example of a portable computing device in the form of a laptop computer is shown in side elevation view in FIG. 1A. As shown, laptop computer 1 can include an upper lid or display portion 10, and a lower base portion 20, which lower base portion can include one or more processors, memories, batteries, power sources, keyboards, buttons, touchpads ports and the like. A hinge mechanism 30 can generally serve to mechanically pivotally couple lid portion 10 to base portion 20.

Figure 1B:
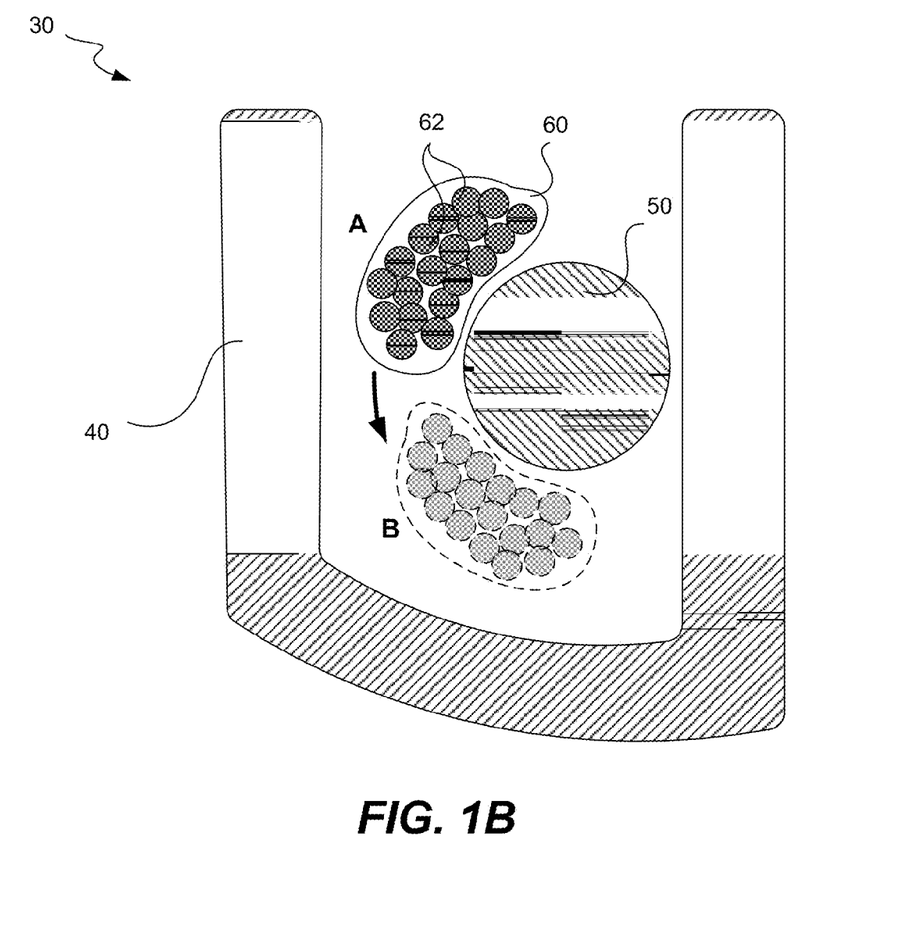
FIG. 1B illustrates in side cross-sectional view an exemplary hinge mechanism from the portable computing device of FIG. 1A

Continuing with FIG. 1B, an exemplary hinge mechanism from the portable computing device of FIG. 1A is illustrated in side cross-sectional view. Hinge mechanism 30 can include an outer clutch barrel 40, an internal clutch 50, and a collection of wires or other electrical connectors 62, which may be enclosed in an outer cover 60 or otherwise bound together, as will be readily appreciated. Such electrical connectors generally serve to provide power and communications between devices in the lid and base portions of a portable computing device, such as power and data from the base unit to a display device in the lid unit. Communications from an antenna in the lid portion to a processor in the base portion is another example of a use for one of electrical connectors 62.

As shown, the grouping of electrical connectors 60 typically shifts from a first position A to a second position B when the lid portion and base portion of the portable computing device are moved or pivoted with respect to each other. Although such a movement in the grouping of wires or electrical connectors 60 is generally well known, such movements are generally disadvantageous in that continued movements can cause wear and tear to the wirings 62, or eventual blockage, increased friction or other undue inconvenience with respect to the pivoting hinge mechanism itself as a result of long term extend use.

Figure 2A:
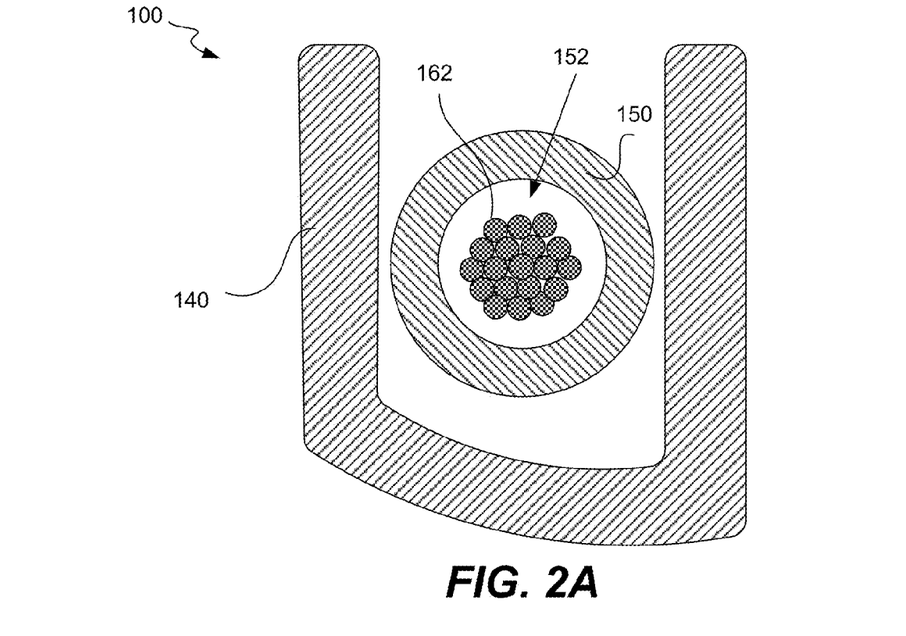
FIG. 2A illustrates in side cross-sectional view an alternative exemplary hinge mechanism having a hollow clutch according to one embodiment of the present invention.

Turning next to FIG. 2A, an alternative exemplary hinge mechanism having a hollow clutch according to one embodiment of the present invention is similarly shown in side cross-sectional view. Similar to above hinge mechanism 30, inventive hinge mechanism 100 can include an outer clutch barrel 140 as well as an internal clutch 150. Unlike the foregoing hinge mechanism, however, the internal clutch 150 of hinge mechanism 100 is hollow, and allows for the passage of a cluster or collection 160 of electrical conductors 162 through a cavity 152 therethrough. In some embodiments, such an internal hollow clutch 150 can be cylindrical in nature, and can have an annular outer region and a central bore region surrounded by the annular outer region. Again, the central bore region is adapted to permit the passage of and provide support for one or more electrical conductors adapted to electrically connect a base portion to a lid portion of a portable computing device.

The various advantages for such a hollow clutch component are numerous. The annular clutch can be stiffer and lighter with a larger diameter, since the need for space for electrical conductors outside the clutch is eliminated. In one example, the radius of a cylindrical clutch can be increased from 4.0 to 4.8 millimeters without changing the size of the clutch barrel, due to the electrical conductors being relocated to inside the hollow clutch. A mechanical stop put on the outside of the larger diameter clutch then has a lower moment to apply force, which requires less force to stop the clutch during rotation, as will be readily appreciated. A larger diameter clutch also results in more surface area to help stop movement using a friction band, as will also be readily appreciated. In addition, rather than the electrical wires or cables being moved back and forth between to points, such as points A and B above, rotation of the lid and base components only results in slight twisting of the electrical connectors, which eliminates or substantially reduces wear and tear problems in that regard. In one example, the hollow clutch material can be steel, although a variety of different materials can be used, as will be readily appreciated.

Figure 2B:
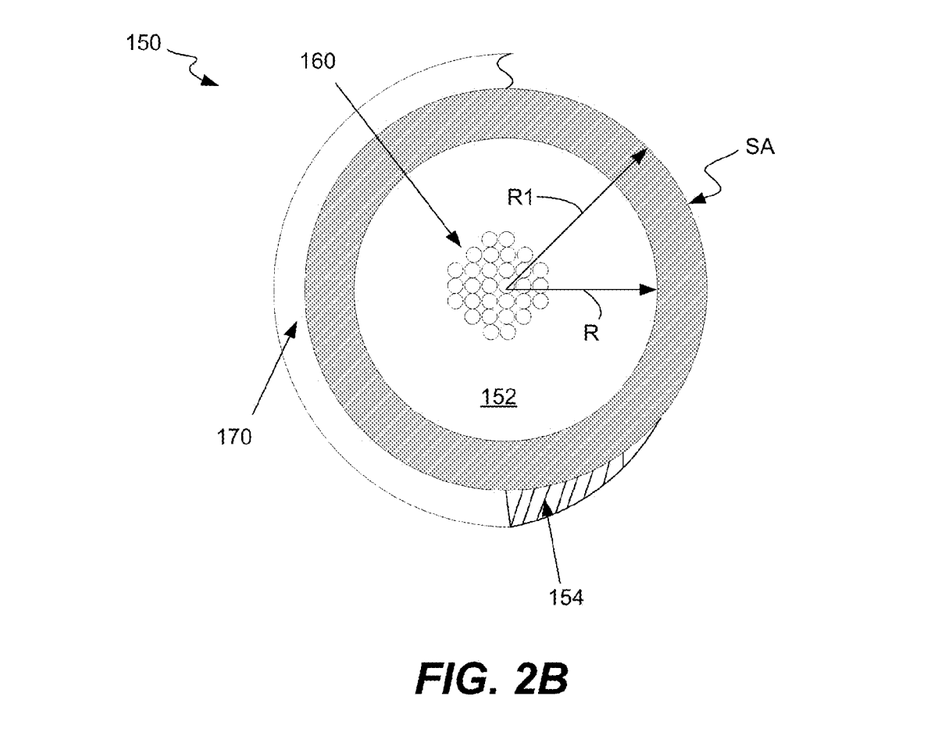
FIG. 2B illustrates in side cross-sectional view the exemplary hollow clutch of FIG. 2A according to one embodiment of the present invention.

Continuing with FIG. 2B, the exemplary hollow clutch of FIG. 2A is illustrated in side cross-sectional view according to one embodiment of the present invention. Clutch 150 can be formed of any suitable material such as stainless or alloy steel having outside radius $R_1$ having an exterior surface area $S_A$ per unit length defined as equation 1 as:

$$S_A = 2\pi R_1. \quad \text{Eq (1)}$$

Clutch 150 can include interior region 152 having inside radius R defining interior volume $S_{VOL}$ per unit length as defined as equation (2):

$$S_{VOL} = \pi R^2. \quad \text{Eq (2)}$$

In the described embodiment, inside radius R can vary to provide sufficient space to accommodate cable bundle 160. As noted above, cable bundle 160 can include a plurality of electrical connectors, wires or cables arranged to electrically connect electrical components in an upper lid portion, such as a display assembly, and base portion or unit pivotably connected to each other by way of clutch 150. In this way, both power and data can be passed between the display assembly and base unit.

Isolating cable bundle 160 within the interior volume 152 of clutch 150 helps to reduce cable sliding and reduces the probability of cables snagging. In this way, the reduced snagging provides for greater long term reliability. Moreover, the shape integrity of cable bundle 160 is improved as is the ability to prove out a design is improved since it is no longer necessary to require an entire system to demonstrate that the cables within cable bundle 160 work according to specification. In order to provide restraining force $F_{res}$ sufficient to maintain the display assembly in the open position relative to the base unit, a friction band 170 can be placed in direct contact with the exterior surface $S_A$ of clutch 150 at an outer friction surface. Therefore, restraining force $F_{res}$ per unit length can be directly related to outside radius $R_1$.

Therefore, in addition to providing a secure inner repository for cable bundle 160, due to the increase in outside radius, the friction force created can be also be increased due at least in part to the increase in outer surface area, as well as the increase in moment arm due to the greater value of the outside radius R1. In this way, hollow clutch 150 can be stiffer and lighter. Moreover, an end stop 154 can be placed on an outside surface $S_A$ of the clutch 150. Due to the larger radius R1 of the clutch, a lower moment is required to be applied to generate a given force to stop movement of the display or upper assembly, such as by a corresponding stop (not shown) outside the hollow clutch that acts against clutch end stop 154 where the amount of rotation between lid and base portions is desired to end, as will be readily understood.

Figure 3:
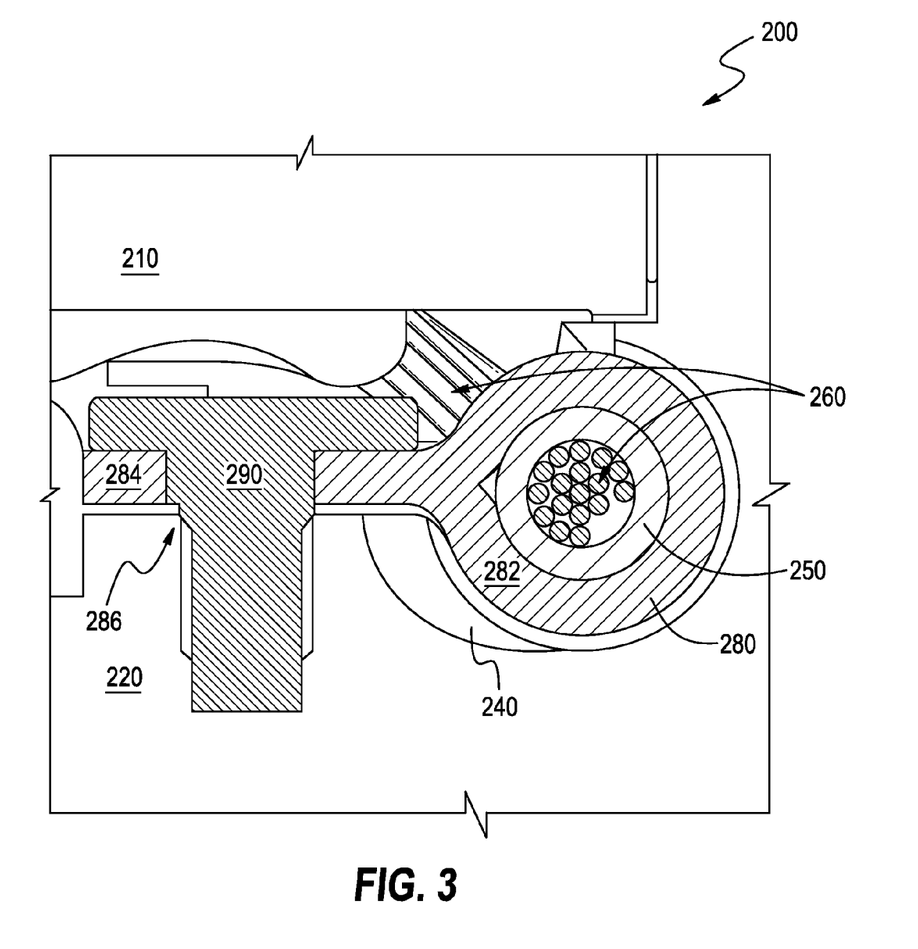
FIG. 3 illustrates in partial side cross-sectional view the exemplary hinge mechanism of FIG. 2A as being installed in a portable computing device according to one embodiment of the present invention.

Moving next to FIG. 3, the exemplary hinge mechanism of FIG. 2A is depicted in partial side cross-sectional view as being installed in a portable computing device according to one embodiment of the present invention. Portable computing device 200 can be, for example, a laptop computer having an upper or lid portion 210 and a lower or base portion 220, only portions of which are shown here for purposes of illustration and focus. A hinge mechanism used to pivotally couple the lid and base portions can include a clutch barrel 240, a hollow clutch 250 and at least one fastening component 280, which can be used to couple the hollow clutch to the base portion 220 of the portable computing device 200. A plurality of cables or electrical connectors 260 can pass through the hollow portion of clutch 250, and travel to respective connections at the base portion 220 out of one end of the hollow portion, and also travel to respective connections at the lid portion 210 (not shown) out of the other end of the hollow portion.

Fastening component 280 can include a portion 282 that surrounds all or part of the outer circumference of hollow clutch 250 at least one location, and also another portion 284 having one or more holes 286 therethrough to allow for fastening to the base portion 220 of the portable computing device. One or more fasteners 290 can be used through the one or more holes 286 in fastening component 280 to fasten the base portion 220 to the hollow clutch 250. Such fasteners 290 can be, for example, screws, bolts, nails, pins, rivets or any other suitable fastening device, as will be readily appreciated by those skilled in the art.

Figure 4A:
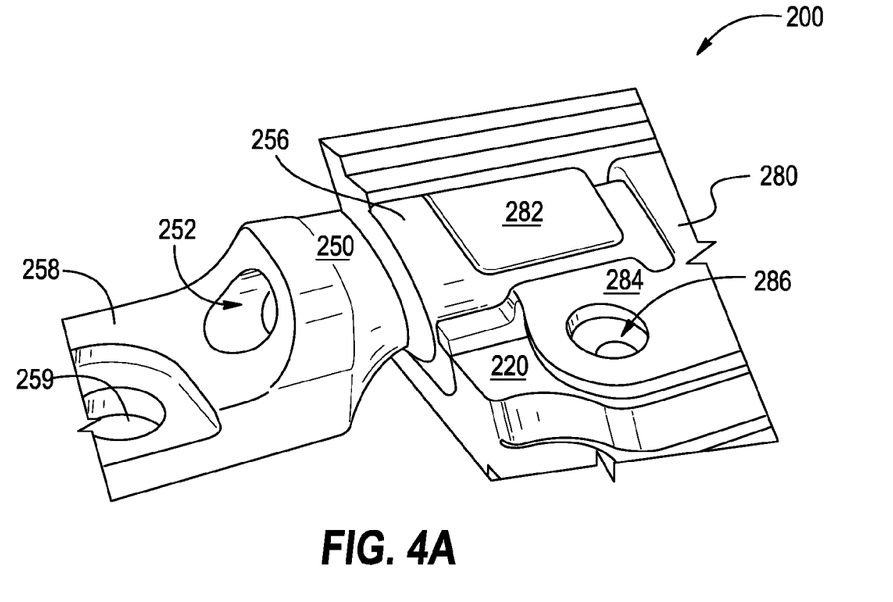
FIG. 4A illustrates in partial top perspective view the integrated hollow clutch and connector of the exemplary hinge mechanism of FIG. 3 as installed but with the wirings removed according to one embodiment of the present invention.

Continuing with FIG. 4A, the integrated hollow clutch and connector of the exemplary hinge mechanism of FIG. 3 as shown as installed again, but with the wirings removed and in partial top perspective view. Again, portable computing device 200 can include a base portion 220 (partially shown in cutaway view) that is pivotally coupled to a top or lid portion (not shown) by way of a hinge mechanism having a hollow clutch 250. This hollow clutch 250 can have a first region 256 having an annular outer component and a central bore component surrounded by the annular outer component, wherein the central bore component is adapted to permit the passage of and provide support for one or more electrical conductors adapted to electrically connect the base and lid portions, as described above. Such a first region 256 having an internal cavity 252 can be cylindrical, for example.

In addition, the hollow clutch 250 can also include a second region 258 having a fastening component or integrated mount adapted to couple the hollow clutch to the lid portion or the base portion of the portable computing device. Such a second region 258 can be flat and have one or more holes 259 through it, for example. Preferably, the first hollow region 256 and the second region having a fastening component 258 are integrally formed as a single part, which again can be formed of any suitable material, such as stainless or alloy steel. The one or more holes 259 are adapted to permit one or more fasteners (not shown) to pass therethrough, which then results in the fastening of the hollow clutch and connector 250 to the lid portion of the computing device.

Similar to the foregoing, such fasteners can be, for example, screws, bolts, nails, pins, rivets or any other suitable fastening device, as will be readily appreciated by those skilled in the art. Also, it will be readily appreciated that although the exemplary embodiments of FIGS. 3 and 4A show separate fastening component 280 as coupling the clutch portion 256 to the base portion 220 and the integrated fastening component 258 as coupling the clutch portion to the lid portion 210 of the portable computing device, such an arrangement can be readily reversed. That is, the integrated clutch and fastening component 250 can instead be directly fastened to the base portion, while the separate fastening component 280 can couple the hollow clutch portion 256 to the lid portion of the computing device.

Figure 4B:
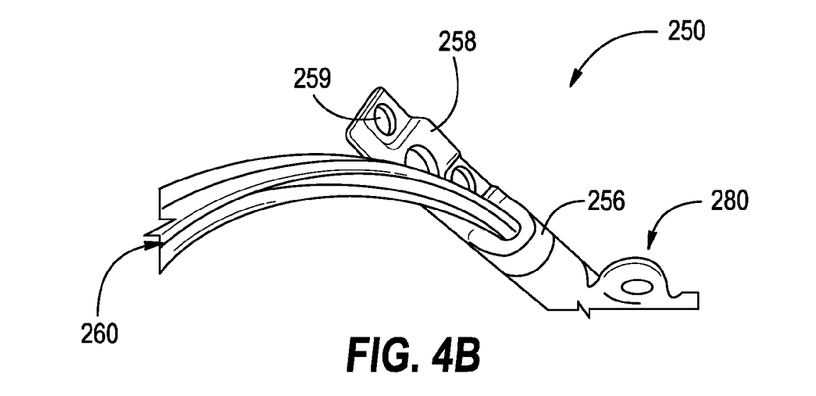
FIG. 4B illustrates in elevated end perspective view the removed exemplary integrated hollow clutch and connector of FIG. 4A with wirings installed according to one embodiment of the present invention.

FIG. 4B illustrates in elevated end perspective view the removed exemplary integrated hollow clutch and connector of FIG. 4A with wirings installed according to one embodiment of the present invention. As seen from this different perspective, integrated hollow clutch and fastening component 250 again includes a hollow and cylindrical first region 256 that supports and allows various cables or electrical connectors 260 to pass therethrough, as well as a fastening component second region 258 having one or more holes 259 therethrough. Again, this second region 258 is adapted to facilitate the direct fastening of the hollow clutch to one of a lid or base portion of an associated computing device. Also shown is the separate fastening component 280 that couples the integrated hollow clutch and fastening component 250 to the other of the lid and base portions.

Figure 5:
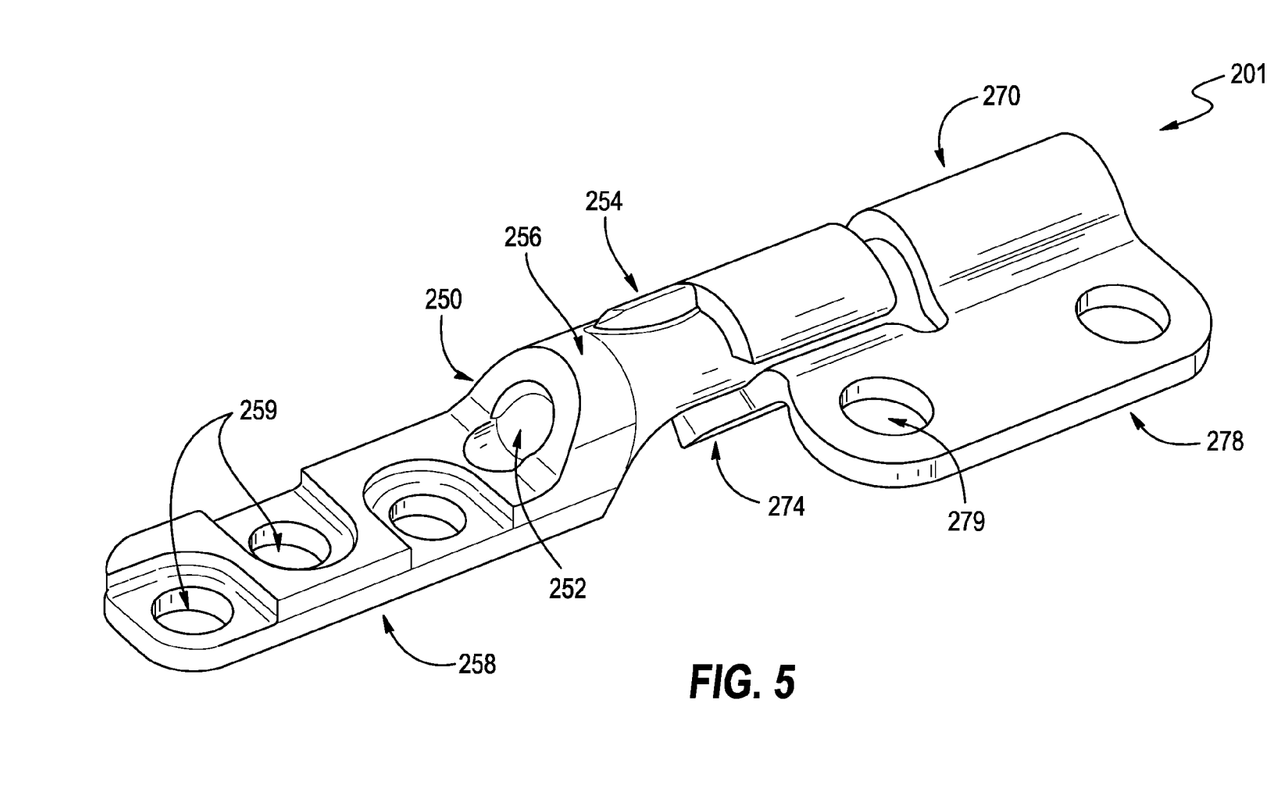
FIG. 5 illustrates in top perspective view an exemplary hollow clutch and friction band combination according to one embodiment of the present invention.

Turning next to FIG. 5 an exemplary hollow clutch and friction band combination according to one embodiment of the present invention is illustrated in top perspective view. Hollow clutch and friction band combination 201 can be identical or substantially similar in many or all regards to that which is shown in FIGS. 4A and 4B. In particular, integrated hollow clutch and connector 250 can include a first region or shaft 256 having an internal cavity 252 and a second region or integrated mount 258 having one or more holes 259. An integrated stop 254 can also be formed on an outer surface of the shaft portion 256.

In addition, an integrated friction band and fastening component 270 can serve both to provide friction against shaft 256 during component rotation, and also to fasten or mount the friction band to the respective base or lid portion of the computing device. In such an arrangement where the friction band doubles as a mount or fastening component, then friction band 270 effectively serves as the fastening component 280 above. As such, integrated mount portion 278 is the equivalent of portion 284 above, while holes 286 and 279 are effectively the same. Also, an integrated stop 274 on friction band and integrated mount 270 can be strategically formed and positioned to interact with opposing integrated stop 254 on hollow clutch and connector 250, such that relative rotation between these parts is stopped at a particular angle or location.

Numerous advantages arise through the use of such an integrated hollow clutch and fastening component as a single part. Again, the hollow clutch portion can be stiffer and lighter with a larger diameter, since the need for space for electrical conductors outside the clutch is eliminated. A mechanical stop put on the outside of the larger diameter clutch then has a lower moment to apply force, which requires less force to stop the clutch during rotation, such that the mechanical stop can be smaller yet stronger and more reliable. A larger diameter clutch also results in more surface area to help stop movement using a friction band, as will also be readily appreciated. Reduction in movement to the cables or electrical connectors is also an advantage. Furthermore, the integration of at least one fastening component with the hollow clutch component, such as components 256 and 258 in single part 250, results in a lower part count, smaller part size and greater strength for the overall hinge mechanism, all of which result in greater ease in manufacturing.

Even further advantages can be realized through the use of such a hollow clutch design. For example, in addition to the cables or electrical connectors, the hollow clutch can also readily facilitate the use of a thermal conduit or heat exchanger running therethrough. Such a heat exchanging component can be adapted to sink heat at one or more locations at the base portion, and conduct this heat through the hollow clutch and into the upper or lid portion, where the heat can then be dispersed. In the event that heat in the lid portion is the greater problem, then the reverse can be true for such a thermal conduit through the hollow clutch.

Yet another application for the hollow portion of the clutch can be as a reservoir for grease, oil or any other suitable lubricant. As will be readily appreciated, it may be desirable to facilitate the lubrication of various frictionally contacting parts within the hinge mechanism. To the extent that an ongoing ready supply of lubricant can be located within the hinge mechanism itself, a suitable design can increase the lifespan of such frictionally contacting parts, or at least extend the lengths of time that are required between parts servicing. Such a lubricant can be contained within the hollow clutch region, with one or more caps, seals and/or strategically places and sized openings, such that a desired amount of grease, oil or other suitable lubricant is made available as it may be desirable for part lubrication.

Figure 6:
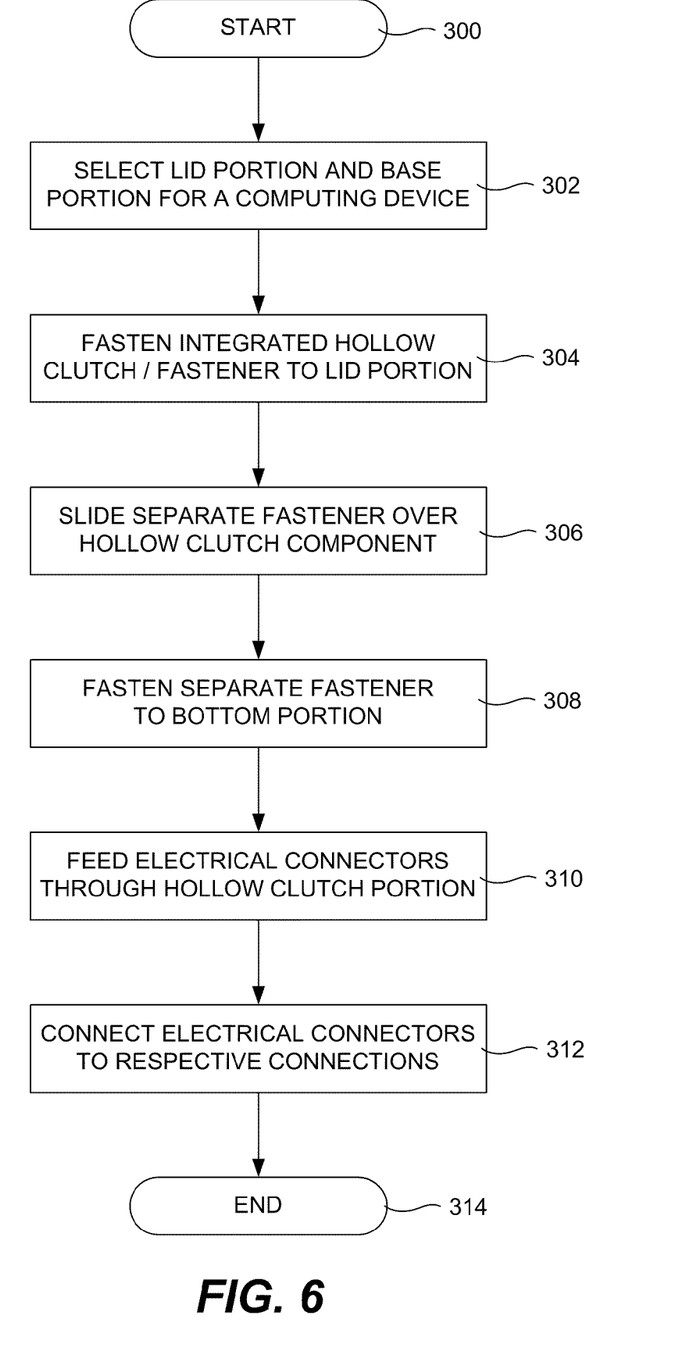
FIG. 6 provides a flowchart of an exemplary method of attaching a lid portion to a base portion of a computing device using an integrated hollow clutch and fastener according to one embodiment of the present invention.

Lastly, FIG. 6 provides a flowchart of an exemplary method of attaching a lid portion to a base portion of a computing device using an integrated hollow clutch and fastener according to one embodiment of the present invention. It will be understood that the provided steps are shown only for purposes of illustration, and that many other or different steps may be included in the process, as may be desired. Furthermore, the order of steps may be changed where appropriate and not all steps need be performed in various instances. For example, steps such as steps 304 and 306 may be reversed, while step 312 may be at least partially performed at any point in the process. Other differences may also be possible, and it will be readily appreciated that the described steps and order are not limiting in any way.

After a start step 300, an initial process step 302 involves selecting a lid portion and a base portion to be coupled together to form a single computing device, such as a laptop computer, for example. At subsequent process step 304, a single part integrated hollow clutch and fastening component is fastened to the lid portion. Again, the integrated clutch and fastening component could alternatively be fastened to the base portion instead, such as where a separate fastening component is to be fastened to the lid portion instead, as noted above.

At the next process step 306, a separate fastening component is slid over or otherwise coupled to the outer surface of the hollow clutch component, after which the separate fastener is fastened to the base or bottom portion of the computing device at step 308. At step 310, one or more cables or electrical connectors are fed through the hollow clutch portion, with one end of the connectors intended for the lid portion and the other end of the connectors intended for the base portion. At following process step 312, the cables or electrical connectors are then connected to their respective connections at the base and lid portions of the computing device. At the least, such connections are preferably completed at step 312, such as where initial connections may be made earlier in the process, after which the method then ends at end step 314.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A hinge assembly arranged to pivotally couple a portable computer base portion to a portable computer lid portion, comprising:
   an outer clutch barrel;
   a hollow clutch disposed within the outer clutch barrel and having an annular outer region and a central bore region surrounded by the annular outer region, wherein the hollow clutch includes a first opening and a second opening disposed at distal ends of the hollow clutch and providing access to the central bore region,
   at least one electrical conductor configured to electrically couple the base portion to the lid portion, wherein the at least one electrical conductor enters the central bore region through the first opening and exits the central bore region through the second opening;
   a first fastening component adapted to couple the hollow clutch to the lid portion of the portable computing device, wherein the first fastening component is integrally formed with the hollow clutch as a single part; and
   a second fastening component adapted to couple the outer clutch barrel to the base portion of the portable computing device.

2. The hinge assembly of claim 1, wherein the hollow clutch has a cylindrical shape at the annular outer region and central bore region.

3. The hinge assembly of claim 1, further comprising:
   a friction band disposed within the outer clutch barrel and contacting an outer surface of the hollow clutch along the annular outer region, wherein the friction band is configured to provide a restraining force sufficient to maintain the lid portion of the portable computing device in an open position relative to the base portion of the portable computing device.

4. The hinge assembly of claim 1, wherein the central bore region contains and disperses a lubricant that operates to lubricate any surfaces of interacting parts within the outer clutch barrel.

5. The hinge assembly of claim 1, wherein the central bore region is further configured to permit the passage of and provide support for a heat exchanging component configured to facilitate a transfer of heat between the base portion and the lid portion of the portable computing device.

6. The hinge assembly of claim 1, wherein the portable computing device is a laptop computer.

7. The hinge assembly of claim 1, wherein the first fastening component is integrally formed with the hollow clutch and comprises a flattened surface having one or more holes extending therethrough, wherein the one or more holes are configured to accept one or more fasteners that fasten the first fastening component and hollow clutch to the lid portion of the portable computing device.

8. The hinge assembly of claim 7, wherein the one or more fasteners are selected from the group consisting of: screws, bolts, nails, pins and rivets.

9. A portable computing device, comprising:
   a base portion having a plurality of components including at least a processor and one or more user input devices;
   a lid portion having a display in communication with one or more of the plurality of components in the base portion;
   a hinge assembly that pivotally couples the base portion to the lid portion, the hinge assembly further comprising:
      an outer clutch barrel;
      a hollow clutch disposed within the outer clutch barrel and having an annular outer region and a central bore region surrounded by the annular outer region, wherein the hollow clutch includes a first opening and a second opening disposed at distal ends of the hollow clutch and providing access to the central bore region,
      a first fastening component that facilitates the coupling of the outer clutch barrel to the base portion, and
      a second fastening component that facilitates the coupling of the hollow clutch to the lid portion; and
   at least one electrical conductor configured to electrically couple the base portion to the lid portion, wherein the at least one electrical conductor enters the central bore region through the first opening and exits the central bore region through the second opening.

10. The portable computing device of claim 9, wherein the portable computing device is a laptop computer.

11. The portable computing device of claim 9, wherein the hollow clutch has a cylindrical shape at the annular outer region and the central bore region.

12. The portable computing device of claim 9, wherein the hinge assembly further comprises:
   a friction band contacting an outer surface of the hollow clutch along the annular outer region, wherein the friction band is configured to provide a restraining force sufficient to maintain the lid portion in an open position relative to the base portion.

13. The portable computing device of claim 9, wherein the central bore region is configured to contain and disperse a lubricant that operates to lubricate the surfaces of interacting parts associated with the hinge assembly.

14. The portable computing device of claim 9, further comprising:
   a heat exchanging component located within the central bore region and configured to facilitate a transfer of heat between the base portion and the lid portion.

15. The portable computing device of claim 9, wherein the second fastening component is integrally formed with the hollow clutch and includes a flattened surface having one or more holes extending therethrough, the one or more holes accepting one or more fasteners that fasten the second fastening component and hollow clutch to the lid portion.

16. A hollow clutch configured to help pivotally couple a portable computer base portion to a portable computer lid portion, comprising:
- a first region having an annular outer component and a central bore component surrounded by the annular outer component, wherein the first region includes a first opening and a second opening disposed at distal ends of the first region and providing access to the central bore region
- a second region having a fastening component configured to couple the hollow clutch to the lid portion of the portable computing device, wherein the first region and the second region are integrally formed as a single part; and
- at least one electrical conductor configured to electrically couple the base portion to the lid portion, wherein the at least one electrical conductor enters the central bore region through the first opening and exits the central bore region through the second opening.

17. The hollow clutch of claim 16, wherein the first region is cylindrical.

18. The hollow clutch of claim 16, wherein the central bore region is further configured to contain and disperse a lubricant that operates to lubricate any surfaces of interacting parts associated with the hollow clutch.

19. The hollow clutch of claim 16, wherein the central bore region is configured to include and provide support for a heat exchanging component configured to facilitate a transfer of heat between the base portion and the lid portion of the portable computing device.

20. The hollow clutch of claim 16, wherein the second region includes a flattened surface having one or more holes extending therethrough, the one or more holes configured to accept one or more fasteners that fasten the second region to the lid portion.

21. A method of attaching a lid portion to a base portion of a computing device, comprising:
- selecting a lid portion and a base portion to be combined to form a finished single computing device;
- coupling an outer clutch barrel to the base portion;
- coupling a hollow clutch to the lid portion and positioning the hollow clutch within the outer clutch barrel, wherein the hollow clutch includes a first region having an annular outer component and a central bore component surrounded by the annular outer component, and a second region having a fastening component configured to couple the hollow clutch to the lid portion, the first region further comprising a first opening and a second opening disposed at distal ends of the first region and providing access to the central bore region;
- positioning at least one electrical conductor within the central bore portion of the hollow clutch, wherein the at least one electrical conductor enters the central bore region through the first opening and exits the central bore region through the second opening; and
- connecting the at least one electrical conductor to corresponding connections at both of the lid portion and the base portion of the computing device.

* * * * *